United States Patent [19]

Thompson

[11] Patent Number: 4,709,824

[45] Date of Patent: Dec. 1, 1987

[54] TAMPER EVIDENT PLASTIC CAPS WITH LOWER SEPARABLE OR BREAKAWAY PORTIONS AND A METHOD OF FORMING THEM

[75] Inventor: Mortimer S. Thompson, Arlington, Mass.

[73] Assignee: Tri-Tech Systems International Inc., Maumee, Ohio

[21] Appl. No.: 809,057

[22] Filed: Dec. 12, 1985

[51] Int. Cl.⁴ .............................................. B65D 41/34
[52] U.S. Cl. ............................. 215/252; 215/DIG. 1; 264/295; 264/296; 264/322
[58] Field of Search ................. 215/252; 264/296, 320, 264/322, 295

[56] References Cited

U.S. PATENT DOCUMENTS

| | | |
|---|---|---|
| 2,961,119 | 11/1960 | Leach . |
| 3,065,677 | 11/1962 | Loeser .............................. 264/296 X |
| 3,243,851 | 4/1966 | Reitter, Jr. et al. ................. 18/42 |
| 3,374,913 | 3/1968 | Zipper ................................ 215/252 |
| 3,405,439 | 10/1968 | Vemura ........................... 264/296 X |
| 3,460,703 | 8/1969 | Leftault ............................. 215/252 |
| 3,861,551 | 1/1975 | Hannon ............................ 215/252 |
| 4,016,996 | 4/1977 | Aichinger et al. ................. 215/344 |
| 4,069,937 | 1/1978 | Smalley ............................ 215/344 |
| 4,090,631 | 5/1978 | Grussen ............................ 215/329 |
| 4,143,785 | 3/1979 | Ferrell .............................. 215/270 |
| 4,196,818 | 4/1980 | Brownbill ......................... 215/252 |
| 4,206,852 | 6/1980 | Dunn et al. ....................... 215/252 |
| 4,257,525 | 3/1981 | Thompson ..................... 215/100 A |
| 4,281,774 | 8/1981 | Mumford .......................... 220/306 |
| 4,345,692 | 8/1982 | Obrist et al. ...................... 215/252 |
| 4,360,114 | 11/1982 | Owens .............................. 215/329 |
| 4,360,149 | 11/1982 | Hein, Jr. ............................ 233/26 |
| 4,394,918 | 7/1983 | Grussen ............................ 215/243 |
| 4,418,828 | 12/1983 | Wilde et al. ....................... 215/252 |
| 4,470,513 | 9/1984 | Ostrowsky ........................ 215/252 |
| 4,497,765 | 2/1985 | Wilde et al. ....................... 264/268 |
| 4,506,795 | 3/1985 | Herr ................................. 215/252 |
| 4,550,844 | 11/1985 | Lininger ........................... 215/252 |

FOREIGN PATENT DOCUMENTS

| | | |
|---|---|---|
| 0049876 | 4/1982 | European Pat. Off. . |
| 1811318 | 7/1969 | Fed. Rep. of Germany . |
| 2829755 | 1/1980 | Fed. Rep. of Germany . |
| 2306135 | 10/1976 | France . |
| 1048727 | 11/1966 | United Kingdom . |

*Primary Examiner*—Donald F. Norton
*Attorney, Agent, or Firm*—Hedman, Gibson, Costigan & Hoare

[57] ABSTRACT

A cap for a container and a method of forming the cap. In the method the cap is molded and includes a plastic skirt provided with a line of weakness. An essentially concave surface of a curling tool engages the lower free end of the skirt and curves it into a curled resilient interfering free end which reduces the internal breath of the plastic skirt prior to capping. Upon capping the curled free end is adapted to provide an interference with the container so that upon initial removal of the cap the line of weakness separates to indicate the condition of the container. The interfering curled free end of the plastic skirt can have a coil, O, U or J cross sectional shape.

41 Claims, 26 Drawing Figures

TAMPER EVIDENT PLASTIC CAPS WITH LOWER SEPARABLE OR BREAKAWAY PORTIONS AND A METHOD OF FORMING THEM

FIELD OF THE INVENTION

This invention relates to tamper evident plastic caps for indicating the condition of containers and particularly to caps having separable or breakaway portions to provide a clear and unequivocal indicator of the condition of the containers, e.g., that they have been opened or tampered with. The invention also relates to the method of forming the caps.

BACKGROUND OF THE INVENTION

While bottle caps evidencing tampering by means of depending breakaway rings and separable portions are in popular current use, they have many defects and limitations in their manufacture and performance.

Malleable metals such as aluminum have been used to produce breakaway ring caps wherein the lower portion of the skirt contains a peripheral line of weakness having spaced bridges and a ring portion therebelow rolled inwardly onto and under a peripheral locking ring on the bottle neck during capping to engage it in an interference fit. When the container is uncapped, the bridges break, leaving the depending ring attached to the bottle neck. An option to such a cap design is the addition of vertical lines of weakness peripherally spaced, wherein the depending ring ruptures and the ring portions so produced remain affixed to the cap upon its removal from the container. A common defect in the performance of such a cap is that it is entirely dependent on the control maintained in the cap-rolling operation and since this is accomplished on the packaging line it is often poorly controlled with the result that such caps can appear untampered with in cases where they have been. Additional defects and limitations on the use of metal roll-on caps result from sometimes poorly formed and easily stripped threads; high frictional resistance with the bottle neck, especially with those of glass, making both capping and resealing difficult and erratic; frequent loss of seal when the caps are dented, especially noted in pressurized containers; difficulty in uncapping due to poorly defined exterior fluting needed to adequately grip the cap; and their rapidly rising cost. Some of these limitations can be reduced or eliminated by preforming the entire cap prior to capping including a peripheral line of weakness and a ring with an interfering bead therebelow. However, the non-resilient nature of such caps call for special container neck designs and cap skirt designs with their own set of limitations and defects as well as restrictions on the type of container materials which are suitable to coact with them. See, for example, Leftault, U.S. Pat. No. 3,460,703.

As a result of the defects and limitations noted for metal tamper evident caps, a substantial interest has been displayed in the use of plastic caps for such purposes. Plastics caps present prospects for easier uncapping and more reliable resealing, resistance to denting and resultant loss of seal, well defined exterior fluting for good gripping and comparatively lower cost. However, plastic caps introduce a different set of limitations encountered in their manufacture, capping and subsequent performance. Early tamper evident plastic caps possessed depending rings which could be heat-shrunk to engage the bottle neck locking ring. However, this approach imposed on the packager the added bottling line operation and expense of heating and shrinking the ring after capping. In addition, difficulty in precisely controlling the operation also has led to erratic shrinkage with the result that caps appeared tampered with when they had not been.

As a result of objections to the heat-shrunk tamper evident plastic cap, interest has turned to producing the required ring undercut for an interference fit with the neck prior to the capping operation. To date this goal has been achieved only by making undesirable compromises in manufacturing complexity and cost to achieve the undercut as well as by loss of some effectiveness in performing the tamper evidence function as a result of the ring design and the inherent nature and properties of plastic materials. Ring undercuts which are solid, molded-in circumferential beads preclude the use of the more rigid, "non strippable" polymers such as polystyrene and add to manufacturing complexity and cost by requiring molds with complicated part ejection systems which increase mold cost and lower molding productivity. A slitting operation subsequent to molding to provide the line of weakness may also be required. However, its tamper evidence may be marginal because the amount of undercut possible even with such compromises typically is also marginal. That is, the feature may grip the bottle neck sufficiently to perform adequately in normal use but not when confronted by a serious tamperer. The performance of such features is also impaired by the inherent ease of deformation and elongation of the plastic materials used which may allow them to stretch beyond their elastic limit during capping, increasing their diameter and thereby reducing the amount of ring interference with the container neck. Further, such breakaway rings are sometimes engaged with the container neck under a continuing stress which over a period of time produces plastic creep, thereby further reducing the tenacity of the gripping engagement and the integrity of the tamper evidence.

Attempts to avoid the problems associated with producing plastic caps having a solid molded-in undercut on its breakaway ring have led to designs and manufactuing methods which produce a plurality of flaps on the ring interior which may fold out of the way on removal from the mold and which are subsequently folded into an interfering position prior to capping. See, for example, Wilde et al, U.S. Pat. No. 4,497,765, Grussen, U.S. Pat. No. 4,394,918 and Ostrowsky, U.S. Pat. No. 4,470,513. Such approaches have their own manufacturing problems which include complex and costly molds, manufacturing operations subsequent to molding or because of the ready foldability of their interference-producing flaps, their tamper evidence can be readily foiled by a serious tamperer.

Another problem is associated with the fact that otherwise standard bottle neck designs often vary only because their locking ring dimensions vary and prior art plastic caps having preformed breakaway rings are specific to a single bottle neck design. As a result a cap from a given production mold can only be used by packagers employing very much the same bottle neck locking ring design and dimensions. This dictates the use of a larger number of smaller molds resulting in reduced productivity and higher cap manufacturing cost.

Also, it has not generally been feasible to produce metal or plastic caps including depending rings which break into segments and which remain attached to the cap, except by using roll-on metal or heat shrink plastic rings, with the various deficiencies already noted. Plastic caps with molded-in ring undercuts and vertical lines of weakness present problems with premature ring breakage during mold removal or during capping.

Thus, known tamper evident caps with depending breakaway ring features are beset with drawbacks and problems associated with the inherent characteristics of the materials selected; the need to perform difficult-to-control operations on packaging lines; complex and expensive manufacturing tools; low manufacturing productivity and high costs; the fact that the more rigid plastics are restricted in use; and the relative ease with which the feature may be overcome by a serious tamperer and other problems.

SUMMARY OF THE INVENTION

In accordance with the present invention, there is provided a new and unique tamper evident cap for a container having a lower breakaway or separable ring portion and a method for producing such ring portions, wherein the cap has a simplified design; low mold and production cost; readily controlled and uniform quality and performance; a wide selection of plastics which are suitable; an ability to coact with a greater variety of container neck designs and dimensions; tamper evidence which is difficult-to-defeat and imposed stresses which reinforce the function of the cap.

Generally, the cap of the invention is used with containers having an opening surrounded by a lip or rim with a depending neck having an upper means for releasably engaging a cap and a lower means for interfering with a ring portion of the cap so that the ring, upon uncapping, either will break from the cap or separate into segments while remaining attached to the cap.

The cap of the invention includes a lid for closing and opening the container, a depending skirt having means for releasably engaging the container engaging means in closing and opening the container, a plastic ring depending from the skirt having a curled portion at its lower end providing a reduced internal dimension which engages the underside of the container interfering means and which has induced stresses therein that enhance and reinforce its engaging functions. In addition, lines of weakness in the ring are included either as an intermediate peripheral line of weakness between the skirt and curled portion or vertical lines of weakness in the curled portion or both.

In capping, the curled portion is sufficiently resilient to pass about and below the container interfering means and into interfering engagement therewith without apparent rupturing of the described lines of weaknesses. In the initial uncapping, either the peripheral line of weakness will rupture leaving the ring on the container or the vertical lines of weakness will rupture and separate the ring into segments while allowing the entire cap to be removed. In either embodiment clear evidence of tampering or opening is provided.

In a preferred embodiment, the cap is molded and, as molded, includes a generally cylindrical tube or band depending from the cap skirt which is reformed by tools of the invention that define the lower and inner and/or outer portions of the curled ring portion into the desired curvilinear cross sectional shapes, such as an O, U, J or coil. Typically, the desired cross sectional shapes of the invention can provide reduced internal dimensions for a polypropylene band of at least about 5 per cent for a 28 mm cap and an arc or curved portion of at least about 50 degrees.

In a preferred embodiment, the cylindrical band is reformed by curling into a hollow "O" ring shape wherein its outside diameter is typically close to that of its original outside diameter and its inside diameter is substantially less than the outside diameter of the engaging portion of the container neck. The reforming is achieved by means of a curling tool which compresses the lip of the cylindrical tube preform thereby turning it inwardly and then upwardly channeling and gradually altering the direction of such movement over its curved working surfaces. The initiation of the curling action may be facilitated by providing a taper to the lower free end of the preform. Such a curling action at this point produces a "J" shape or semi-circular radial cross section. After leaving the curved working surface of the tool as it further compresses the cylindrical preform, the lip takes an upward and outward direction resulting from the continuing compression and the stresses imposed by its plastic memory, thereby completing the formation of the hollow "O" ring shape.

In another embodiment, the compression of the cylindrical portion can proceed beyond this point and produce a coiled ring.

To facilitate the curling operation or to alter the dimensions, shape or character of the resultant curled ring, the curling tool can be heated, spun or rolled along the free end of the cylindrical portion during its shaping. The periphery of the free end of the cylindrical portion may be curled simultaneously or sequentially. In other embodiments, the ring can be exposed to elevated temperatures for short periods before capping to alter its dimensions, shape or character or the preform for the ring can be heat treated for the same purpose.

A feature of the invention is that the use of the curling action to reform the cap ring lower end portion not only produces the desired "O" ring or other shape with reduced internal diameter, but also alters and improves the inherent properties of the plastic thereat to reinforce its neck engaging strength. That is, the curling operation during its deformation and reforming of the plastic in the lower end portion also produces built-in stresses therein which are distributed in such a way as to enhance its function. This prestressing places the outward portion of the "O" ring shape in a state of tension or extension and the inward, neck engaging portion in a balancing state of compression. Such a condition of compression increases the effective elastic limit and tensile strength of the plastic so that the ring will better resist temporary or permanent elongation and loss of interference with its coacting neck interference means.

Thus, it is significant to note that the curling method of the invention used to produce the cap ring portion on the one hand produces the desired shape and interfering means by exceeding the elastic and tensile limits of the plastic, yet, on the other hand, yields an article having greatly enhanced elastic and tensile limits in the portion of the ring which performs the critical neck engaging function.

Another feature of the invention is that the cap, as molded, has no interfering bead or other shape projecting from the interior of its cylindrical tube preform as in prior art cap designs which can interfere with ejection of the cap from its production mold. As a result, simple and low cost mold ejection mechanisms can be used.

For instance when made from such semi-rigid plastics as polypropylene and polyethylene, the entire cap can be stripped from the mold, avoiding otherwise called for mold parts and operations such as unscrewing, side-acting or other mechanisms and permitting a closer spacing of the mold cavities. This lowers manufacturing cost through lower cost and longer lasting molds and higher production rates derived from producing larger numbers of caps per molding cycle and reductions in the length of the molding cycle.

Another feature of the invention derived from the fact that the cylindrical tube portion of the cap, as molded, has no undercut to interfere with mold ejection, is that rigid plastics with low elongation characteristics such as polystyrene can be used with the only additional requirement being that suitable ejection means be used for other cap undercuts such as internal threads. Such requirements are readily met by forming the threads using unscrewing or collapsing core molds thereby allowing the cap manufacturer to avail itself of the potential merits of employing such rigid plastics to achieve lower manufacturing cost or improved cap performance. While such rigid plastics lack large amounts of elongation, they do possess a sufficient amount to be suitably curled for the successful practice of the invention. This results in large part from the imposition of significant stresses by the curling method of the invention which enhance the plastics properties by compressing the interior, working portion of the curled breakaway ring effectively increasing its elongation and strength thereat.

Still another feature of the cap of the invention derived from producing the ring undercut subsequent to molding is that the degree of undercut and interference with the bottle neck is not related to or limited to the degree of difficulty in removing such undercuts from the mold. As a result, very much deeper undercuts can be made to achieve a greater gripping tenacity with the bottle neck, thereby presenting would be tamperers with a higher degree of difficulty in defeating the tamper evidence and assuring a more reliable performance in normal use.

Yet another feature of the invention is that relative height and diameter of the curled interfering portion of the ring is determined in a separate reforming operation so that a single cap as molded, may be used to produce caps which will fit a variety of bottle neck designs where the height and diameter of the neck locking ring varies. The costs of the curling tools and the curling operation affect overall cap costs very little, enabling the cap manufacturer to take advantage of the economies of larger scale production for a number of customers or users from fewer and larger production molds.

Another feature of the invention is that the curling operation of the invention may be performed in sequence with or as a part of other steps taken in the manufacture of the cap. That is, it may be performed during or consequent to removal from production molds or during or consequent to cap finishing operations such as liner insertion or lid decoration. It may also be performed simultaneously with or consequent to a curling operation to produce the linerless seal of my U.S. patent application, Ser. No. 809,058, which is being filed at the same time as the present application and which has been assigned to the assignee of the present invention, the entire disclosure of which is hereby incorporated by reference. Also the curling operation has been demonstrated to be non-critical in respect to unusual control or conditions so that automatic operation to produce uniform product can be readily used to achieve high quality at low cost.

Another feature of the invention derived from producing the undercut of the ring subsequent to molding is that the peripheral or vertical lines of weakness can be readily molded into the cap, thus avoiding subsequent slitting operations. Since the cylindrical tube preform has no internal bead to resist stripping from the mold and since the tube itself is relatively thin so that it presents little resistance to being stripped, the bridges which attach it to the upper portion of the cap can be strong enough so that they do not break when being stripped from the mold and yet weak enough to readily break in use during removal of the cap from its bottle neck. For the same reasons the vertical lines of weakness can be readily molded into the tube preform without concern for premature breakage upon mold removal. Thus, the cap of the invention may be molded with the same ease and freedom from limitations as currently produced caps having heat shrink bands as their tamper evidence.

Another feature derived from the fact that the line of weakness can be readily produced in the mold is that its presence, indicated by the distinctive molded slots and bridges, can be made quite obvious, calling the consumer's attention to the tamper evident feature prior to purchase.

Thus, the caps of the invention have simple design; are less easily tampered with and are more reliable; have improved versatility and broader usefulness; can use more rigid plastics; have enhanced physical properties due to prestressing; and are low cost.

The process of the invention can perform automatically and reliably without unusual controls or conditions. It is composed of simple operations yielding low cost caps based on lower cost and longer lasting molds and tools; shorter molding cycles; greater density of and numbers of cavities per mold; the production of the lines of weakness in the production mold, and greater economy of scale derived from the versatility of use for the output of a single mold.

DETAILED DESCRIPTION

Figure 1:
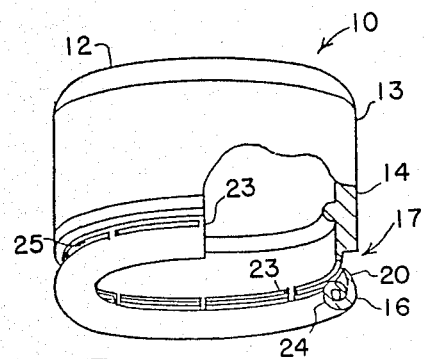
FIG. 1 is a bottom perspective view of one embodiment of the cap of the invention, partially broken away to show details thereof.

Referring to FIG. 1 there is shown a semi-rigid threaded cap 10 of plastic having a lid 12, a depending peripheral internally threaded skirt 14 including an upper portion 13, an intermediate peripheral line of weakness 17 and a lower breakaway ring 16. The illustrated breakaway ring 16 includes a cylindrical upper end 20 and a free curled lower end 24. As shown, the end 24 of the breakaway ring 16 is curled inwardly and forms a hollow annular "O" or coil ring. The intermediate peripheral line of weakness 17 includes a plurality of bridges 23 connecting the upper skirt portion 13 with the upper end 20 of breakaway ring 16 and slots 25 between and separating the bridges 23.

Figure 2:
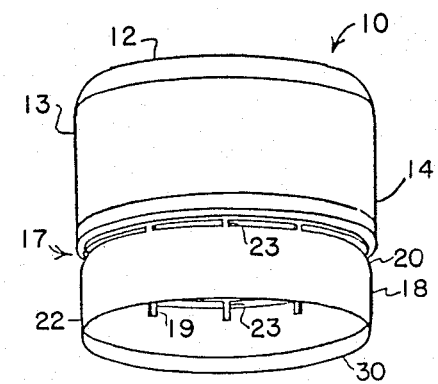
FIG. 2 is a bottom perspective view of the cap of FIG. 1 after molding and which, at this stage, includes a lower preform portion for the ring.

FIG. 2 shows the cap 10 of FIG. 1, as molded and before formation of ring 16, having a tubular vertical band 18 with a lower free end 22 having a lip 30 and an upper end 20 having spaced bumpers 19 which are integral with and which extend into the bridges 23.

Figure 3:
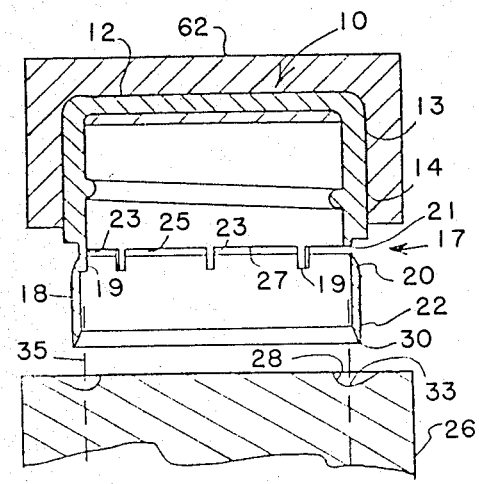
FIG. 3 is a longitudinal sectional view of the cap of FIG. 2, wherein the preform is about to be engaged by a curling, tool of the invention.
Figure 5:
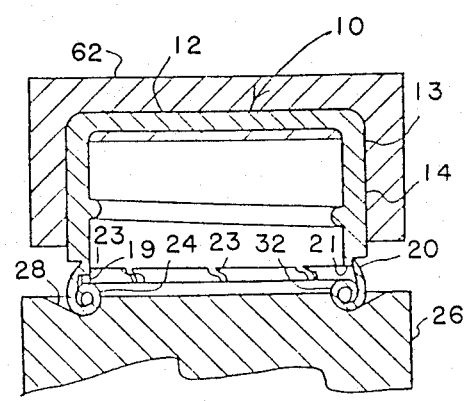
FIG. 5 is generally the same as FIG. 4, except the curling tool has almost completed the curling of the ring.
Figure 4:
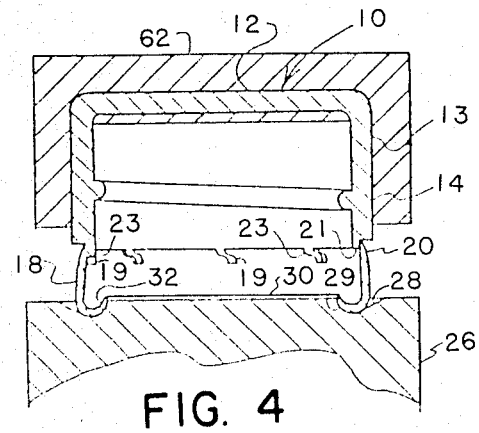
FIG. 4 generally is the same as FIG. 3, except that the curling tool has engaged the preform and initiated the inward curling of the free end thereof.

Referring to FIGS. 3-5, there is shown a preferred method of forming the curled portion 24 of ring 16. As shown in FIG. 3, the cap 10 is held in holder 62 and already has been formed by conventional molding techniques, such as injection molding, with the vertical tubular band 18 having its upper end 20 integral with the bridges 23 and with its lower free end 22 ready for curling.

The curled portion 24 of ring 16 is formed with a curling tool 26, which in FIG. 3 has been positioned under the cap 10 ready to engage the lip 30 of the preformed band 18. The curling tool 26 includes an annular groove 28 of a concave cross section suitable for shaping and dimensioning the curled "O" ring portion 24.

As shown in FIG. 4, the forming operation is accomplished by pressing the groove 28 of the tool 26 against the lip 30 of the band 18. In this embodiment the deepest portion 33 of groove 28 representing the center of its concavity is located inwardly of the cylindrical plane of band 18. This is shown by the dotted lines 35 of FIG. 3. Also, the groove 28 has a slanted portion 39 outwardly and tangent to its concavity to facilitate centering of the tool and cap. At the initial engagement of lip 30 with groove 28 the bridges 23 collapse and the tubular band 18 rotates slightly in response. This response is assured by dimensioning the bridges to be larger (and stronger) in the radial direction and smaller (and weaker) in the circumferential direction. When the bridges 23 collapse, upper end 20 of cylindrical band 18 presses against the upper face 27 of slots 25 and is restrained from further movement by the projecting restraining means 21 located on the inner edge of the upper face 27 of slots 25 and by the upper face 27 itself. As the movement of tool 26 relative to the wall 18 continues the cylindrical sides of the wall 18, beginning with the lip 30, are forced inwardly and upwardly to assume an interim "J" shape 29. As this relative movement continues the lip 30 is forced upwardly out of groove 28, and at the same time is forced outwardly in response to the stresses developed therein while being shaped by tool 26, thereby producing the desired "O" ring curl 24. After formation of the curl 24, the curling tool 26 is withdrawn from the cap 10 and the cap 10 is ready for capping. As shown in FIG. 3 there is a taper in lower free end 22 extending from the rim 30 which facilitates the initiation of the curl 24 and assures development of a full round curve thereat.

Also to facilitate the curling operation of the invention, in the case of polypropylene the tool 26 may be heated to a temperature of 100° F. to 300° F. for curling cycles of one to five seconds. Lower temperatures and cycles are preferred to maximize the desired stresses of the invention imposed by the curling operation on the curl 24 and discussed hereafter in FIGS. 9 to 13.

Typical dimensions of the "O" ring curl 24 in a 28 mm polypropylene cap are about 0.050 to 0.120 inches for the curl height or width and about 0.015 to 0.040 inches in wall thickness with the radial cross section curled about 270 to 540 degrees to reduce the internal diameter of tubular wall 18 about 5 to 15 percent.

Figure 6:
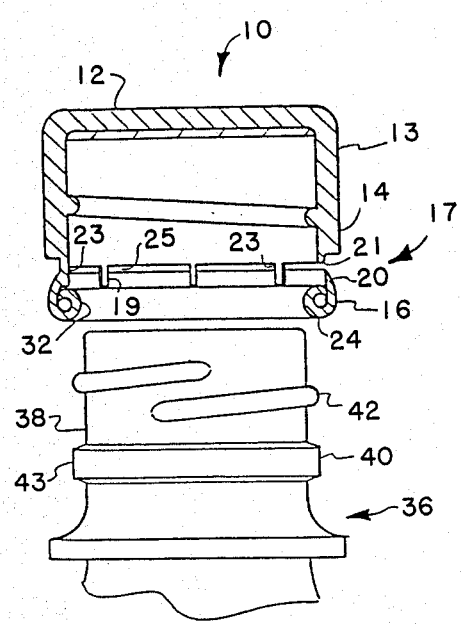
FIG. 6 is a longitudinal sectional view of the cap of FIG. 1 with a completed "0" ring ready for engaging the neck finish of a bottle.
Figure 7:
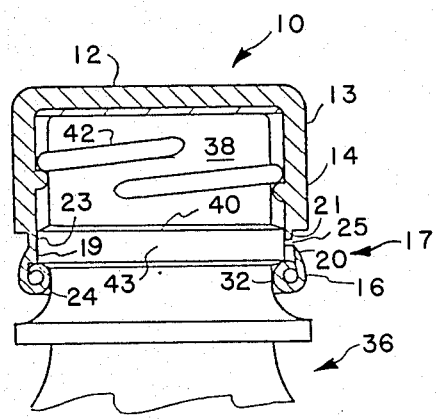
FIG. 7 is the same as FIG. 6, except that the bottle has been closed by the cap and the "0" ring is in engagement with the interfering means on the neck finish.
Figure 8:
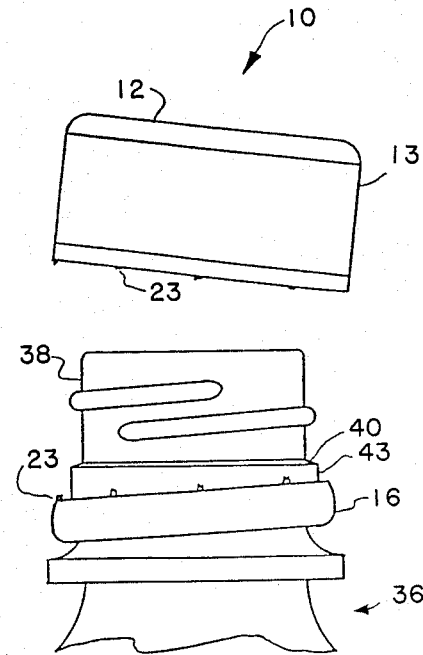
FIG. 8 is a longitudinal view of the cap and neck finish of FIG. 7, wherein the cap has been removed from the neck finish leaving the ring portion thereon as evidence of opening or tampering with the container.

Referring to FIGS. 6-8, there is illustrated the use of the ring 16 of FIGS. 1-5 as a breakaway tamper evident feature of the cap 10 for a bottle 36 (partially shown) having an externally threaded neck 38, an upper thread 42 and a lower locking ring 40. As the cap 10 is threaded onto the bottle neck 38, the curled inside portion 32 of the ring 16, which is a smaller dimension than locking ring 40, is stretched or deflected and forced past the locking ring 40 into an interfering engagement therewith as shown in FIG. 7. The ring 16 is restrained from upward movement by the locking ring 40 so that the unthreading action will rupture bridges 23 leaving the ring 16 on the bottle neck 38 as evidence that the bottle has been previously opened. This is illustrated by FIG. 8. To maintain the axial alignment between the ring 16 and the upper portion 13 of the skirt 14 during cap removal, spaced bumpers 19 are located below each of the bridges 23. Without such bumpers 19, it is possible for the ring 16 to slide sideways under the locking ring 40 after some of the bridges 23 have ruptured thereby compromising the ability to rupture the remaining bridges 23 before losing thread engagement. With the bumpers 19 engaging the vertical surface 43 of locking ring 40, when one or several, but not all, of the bridges 23 break, the ring 16 is held in axial alignment until all the bridges 23 have ruptured.

The curling method of the invention not only produces the hollow "O" ring 24 or other shapes of the invention creating the desired interference with the bottle neck, but it also alters the inherent physical properties of the plastic in such a way as to enhance its neck-engagement tenacity. That is, the plastic at the inwardly directed interfering portion 32 is made stronger, more resilient and creep resistant as a result of the stresses imposed on the plastic during the curling operation. This is explained by FIGS. 9 to 12.

The curling operation, by imposing an alternative shape on the cylindrical vertical band 18, introduces stresses to the resultant shape of the ring 16. That portion of the ring 16 which is stretched is in extension or a state of tension and that part which is compressed is in a state of compression. The stresses vary with the degree of stretching or compression and, as in any static condition, the total amount and direction of each kind of stress balance one another. The stresses of primary concern are those imposed in the hoop direction since it is in this direction that the inside portion 32 of the cap ring 16 must be stretched to overcome its interference with the bottle locking ring 40.

Figure 9:
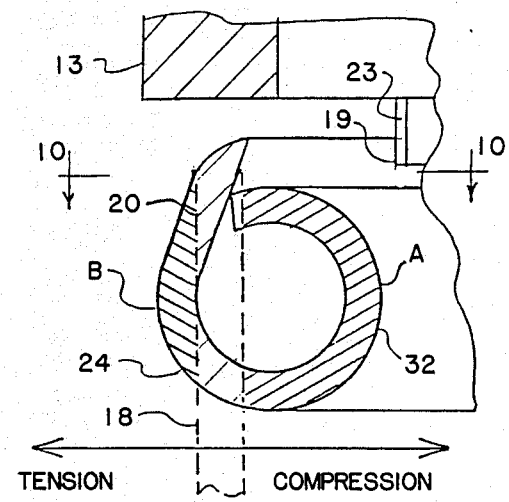
FIG. 9 is an enlarged sectional view of the ring portion of the cap shown in FIGS. 1 and 6, schematically illustrating the stresses induced therein in the hoop direction.
Figure 10:
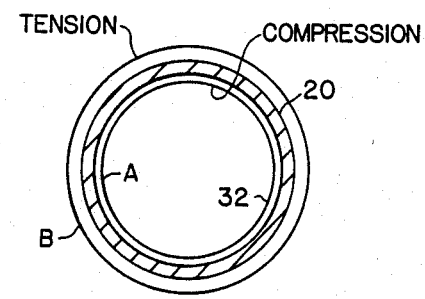
FIG. 10 is a plan view of the ring portion of FIG. 9.

The hoop stresses introduced by the method of the invention result from the increase or decrease of the hoop diameter of the cylindrical band 18 when it is reformed into the "O" ring 24 or other shape ring 16 of the invention. If it is considered that the band 18 is composed of an integrated stack of hoops, each of which must be expanded radially (stretched) or compressed to produce the reformed shape, then a condition of tension or compression will be imposed on each of the hoops in the resultant shape as shown in FIGS. 9 and 10 (respectively a radial cross section and a horizontal plan view of the "0" ring 24). The level of stress is relative to the distance from the location of the original cylindrical band 18 and tension is highest at point B located in that portion of the "O" ring 24 which is furthest from the inside interfering portion 32 and, therefore, plays a secondary role in gripping locking ring 40; stresses are nil at the intermediate location of the original cylindrical preform 18; and compression is highest at point A located in that portion of the "O" ring 24 which plays the principal role in gripping the locking ring 40, the undercut 32 itself.

Figure 11:
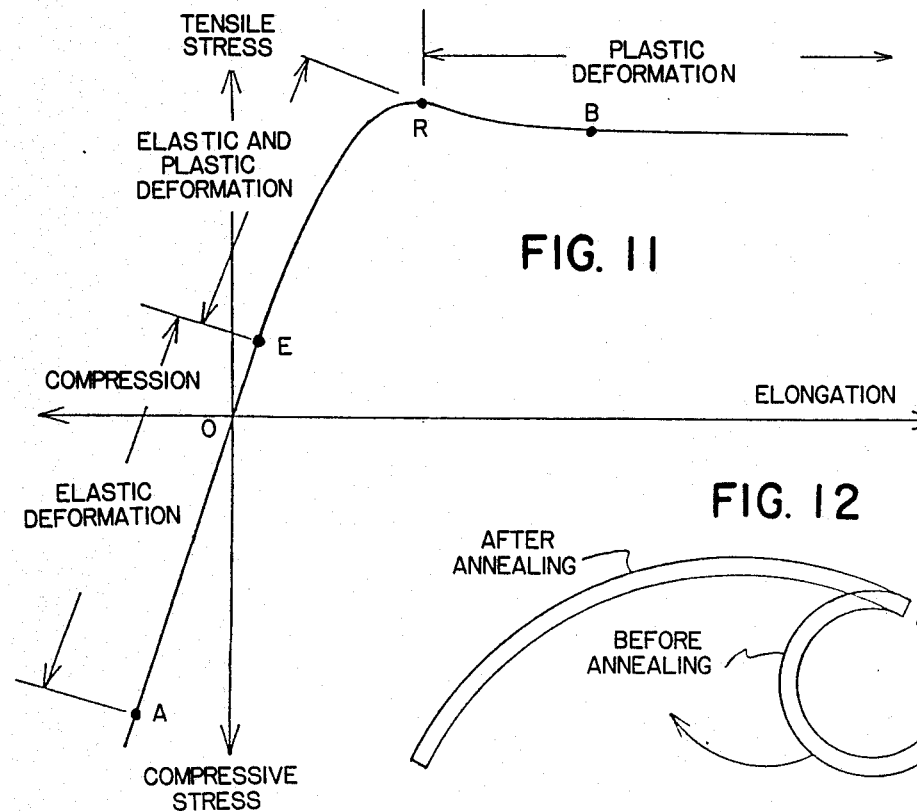
FIG. 11 is a stress-strain graph for the stresses in the previously illustrated ring portion.
Figure 12:
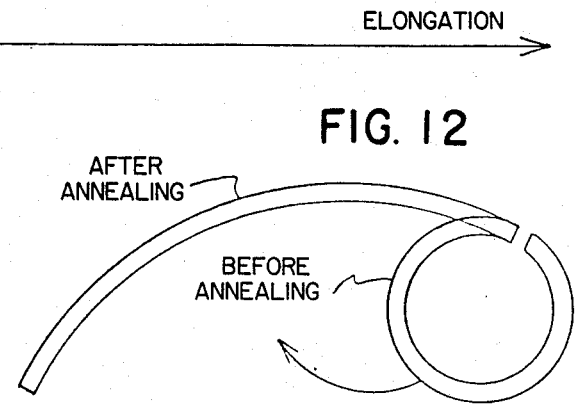
FIG. 12 schematically illustrates what occurs to the "O" ring of FIG. 11 upon release of the hoop stresses.

FIG. 11 shows a typical stress-strain curve for a semi-rigid plastic (e.g., polypropylene) suitable for the practice of the invention. The condition of the hoop stress at points B and A are shown on the curve at typical locations for the practice of the invention (5% elongation and beyond and the corresponding level of compression).

From the location of point A in FIG. 11 it can be seen that the curling action alters the properties of the inwardly directed undercut portion 32 of the "O" ring 24 significantly. Because this undercut 32 is highly compressed, its elastic modulus is maximized and the amount that it can be elongated before plastic or permanent deformation occurs is significantly increased (proportional to the ratio of AE to OE in FIG. 11). The former increases the amount of stress required to obtain enough elongation to overcome the interference between the undercut 32 and the locking ring 40 and the latter prevents the undercut 32 from permanently stretching during or after capping thereby maintaining a relatively greater level of its engagement strength. These factors are highly beneficial towards maximizing the ability of the undercut portion 32 of the "O" ring 24 to generate the maximum amount of engagement with the locking ring 40 and to resist decay of such engagement over long time periods resulting from plastic creep. Thus it can be seen that the distribution of stresses imposed by the curling operation of the invention contributes to the enhanced performance of the "O" ring shape 24 to provide the required interference with the bottle neck.

That the stresses described in the above analysis do in fact exist and are distributed in the manner described is demonstrated by annealing tests to observe the changes in shape which develop as such stresses are relieved. For such tests 0.020 inch thick cylindrical bands 18 of polypropylene were curled in the manner of the invention to yield "O" ring shapes 24 having a ring outside diameter of 1.230 inches, inside diameter of 1.030 and a curl outside diameter of 0.100 inches. The "O" ring 24 was then split radially to facilitate the full release of imposed stresses and then exposed to a temperature of about 300° F., somewhat under the plastic's melting point, for five minutes. Under these conditions, the "O" rings 24 opened up in the hoop direction to a radius of 2.5 inches, a four-fold increase, demonstrating the presence of very high levels of hoop stresses and hoop stress differentials. The dramatic nature of this result, illustrated in FIG. 12, substantiates the preceding analysis wherein the contribution of the stresses imposed by the curling operation alters and enhances the physical properties of the plastic used to manufacture the cap 10 so as to develop higher levels of interference between the "O" ring 24 and the bottle neck locking ring 40 and less decay of such interference.

In addition to an "O" ring, the ring 16 can be of different cross sectional shapes which have the described desirable properties, including J, U and coiled cross sectional shapes.

Also, the ring 16 and its lower end 24 can have various circumferential configurations. For example, the cap 10 as molded can include a castellated band 18 or free end 22 having circumferential segments with spaces therebetween. Thereafter, the free end 22 comprising segments can be curled as described herein to produce a segmented curled lower end 24 with spaces therebetween. Alternatively, the unmodified band 18 can be curled by a curling tool 26 in which the groove 28 is modified to produce on curling an undulated or scallop shape to the inside portion 32 of the curl 24. In use, such caps 10 will function as described to provide a clear indication of the condition of the capped container.

The caps of the present invention also can be used for a wide variety of containers and for a wide variety of products. Typically, cap sizes range from about 20 mm to 120 mm and bottle and/or jar sizes range from about 2 ounce to 128 ounce capacity. Larger capacity containers such as drums or kegs are also suitable for the practice of the invention as are smaller vials and other containers.

Further, the caps of the present invention can include other features including metal lids, seals, etc. Specifically, the caps of the present invention can include the linerless seals disclosed in my U.S. patent application Ser. No. 809,058, which is being filed at the same time as the present application and which has been assigned to the assignee of the present invention, the entire disclosure of which is hereby incorporated by reference.

Figure 13:
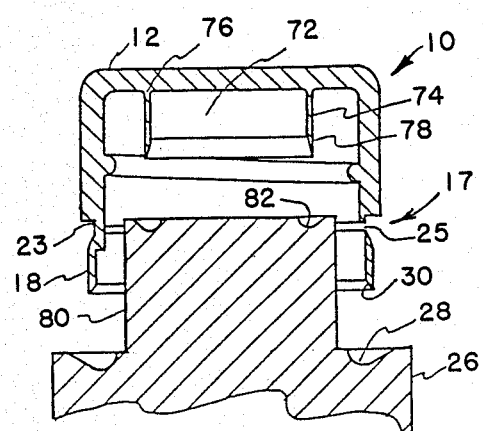
FIG. 13 is a longitudinal sectional view of another embodiment of the cap of the invention including a preform for the ring and a linerless seal within the cap ready for engagement by a curling tool of the invention.
Figure 14:
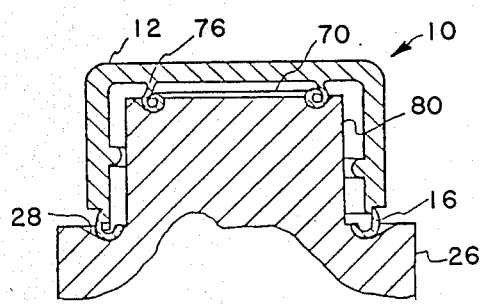
FIG. 14 is the same as FIG. 13, except that the curling tool has fully engaged the preform portions of the cap to form a linerless seal having an O-shape cross sectional shape and an inwardly curled ring having a J-shape cross sectional configuration.
Figure 15:
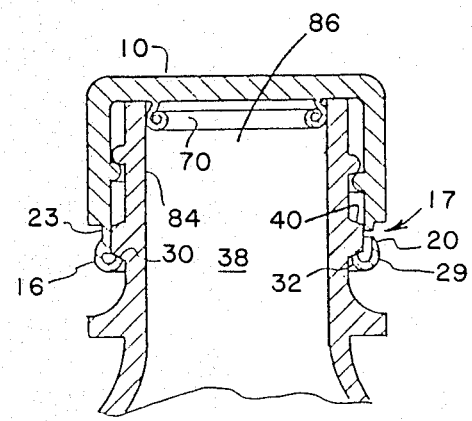
FIG. 15 is a longitudinal sectional view of the completely formed cap of FIG. 14 engaging, initially closing and sealing the illustrated bottle.

FIGS. 13–15 are illustrative of how the curling operation of the invention can be combined with the curling operation of my copending application Ser. No. 809,058 to concurrently form the ring 16 of the present invention and a linerless seal 70 of the invention of my copending application.

As shown in FIG. 13, the cap 10 is molded with a line of weakness 17 and a depending tubular band 18 as well as with the preform 72 for an internal integral or linerless seal 70. The preform 72 includes a cylindrical or annular vertical wall 74 having an upper end 76 integral with the lid 12 and a depending free end 78.

In the illustrative embodiment, the curling tool 26 has an upper portion 80 with an annular groove 82 for forming an inward curl in the free end 78 and an annular groove 28 for forming an inward curl in the free end 22. As illustrated, the tool upper portion 80 is positioned within the annular groove 28, extends upwardly, and has a diameter which is less than the diameter of the cap 10 so that it can extend thereinto to form the linerless seal 70.

In FIG. 13 the tool 26 is positioned below and within the cap 10 ready to engage simultaneously the outer and inner tubular walls 18 and 72. FIG. 14 shows the curling tool 26 fully engaged with cap 10 having completed the formation of an "O" ring linerless seal 70 and a break-away ring 16. In this embodiment the wall 18 is curled to a lesser extent than for the "O" ring curl 24 of FIGS. 1–8 by stopping the curling operation at the stage illustrated by FIG. 4. This results in a "J" shape curl 29 for the ring 16 which engages locking ring 40 of bottle neck 38 as shown by FIG. 15. At the same time the linerless "O" ring seal 70 is a plug seal which engages and seals against the wall 84 of the bottle opening 86 in the neck 38 thereof.

Typical dimensions of the "J" shape curl 29 in a 28 mm polypropylene cap are about 0.015 to 0.050 in wall thickness with a radial cross section curled about 50 to 180 degrees to reduce the internal diameter of the tubular wall 18 by about 5 to 15 percent. Also, since the end 30 of the J shape curl 29 coacts directly with the bottle locking ring 40, any taper provided therein is minimal and typically would extend for a distance of less than 0.050 inches from the end 30. The beneficial stresses developed by the curling operation in the plastic of the "J" shape cross section is less than those developed for the "O" ring shape 24 but still well within the desired levels of compression and improved locking performance of the curled inside portion 32 of ring 16 with locking ring 40 of bottle neck 38.

Figure 16:
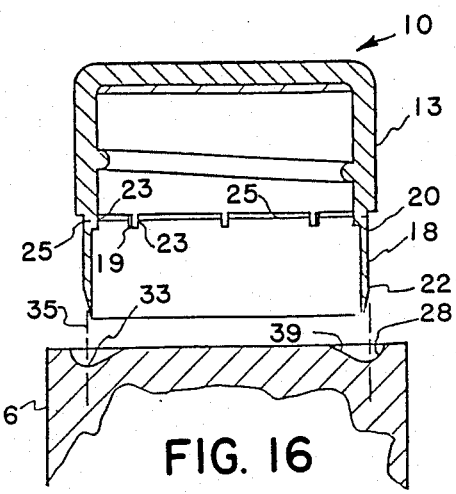
FIG. 16 is a longitudinal sectional view of another embodiment of a cap of the invention after molding and before the preformed lower end is curled to form a ring.
Figure 17:
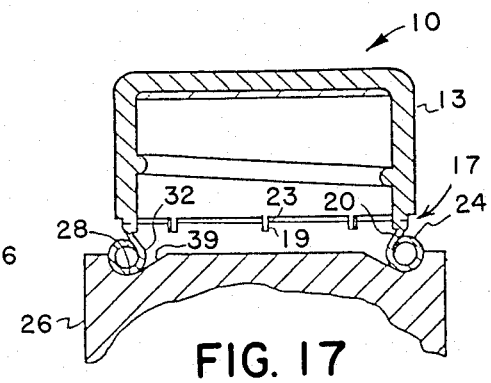
FIG. 17 is a longitudinal sectional view of the cap of FIG. 16, wherein the preform has been curled outwardly to form a ring having a coiled cross sectional shape.
Figure 18:
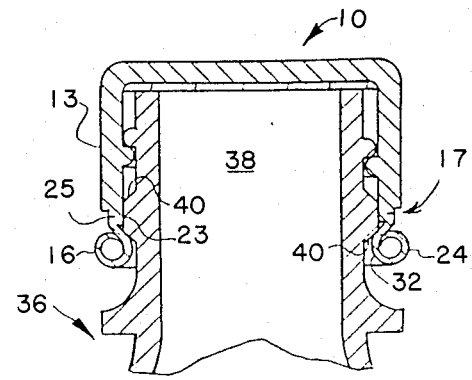
FIG. 18 is a longitudinal sectional view of the completed cap of FIG. 17 engaging and initially closing the illustrated bottle.

Referring now to FIGS. 16–18, there is shown another embodiment of the ring 16 of the invention, wherein the lower end 22 of the tube 18 is curled in an opposite direction to the "O" ring curl 24 of FIGS. 1–8 to provide an outward curl. In addition, the line of weakness 17 is produced after molding.

FIG. 16 shows the cap 10 after molding and after a subsequent slitting operation to produce the line of weakness 17 wherein the upper end 20 of band 18 is slit by appropriate knives (not shown) completely through its wall but not through the spaced internal bumpers 19. This results in spaced internal bridges 23 connecting the band or tube 18 through the bumpers 19 to the upper skirt portion 13. Below the cap 10 the curling tool 26 is positioned with its forming grooves 28 ready to engage the lower end 22 of band 18 so as to shape it outwardly and upwardly. The outward direction of the curl 24 is achieved by locating the center of concavity 33 of groove 28 outwardly of the cylindrical plane of wall 18 as illustrated by the dotted lines 35 of FIG. 16. In this embodiment, to develop the maximum amount of undercut 32 to engage the neck locking ring 40 the undercut 32 must be displaced inwardly from the upper end 20 of band 18 as much as possible. Therefore it is necessary to develop the maximum curvature to the undercut 32. This is accomplished by locating the center of concavity 33 of groove 28 close to the plane of wall 18 and by removing any restraints to the free inward displacement of undercut 32 resulting from the stresses imposed by the curling operation, by providing ample free space in the inward slanted portion 39 of groove 28 as shown in FIG. 17. FIG. 18 shows the engagement of undercut 32 of the cap 10 with the locking ring 40 of bottle neck 38 which results from the curling method of this embodiment of the invention.

Figure 19:
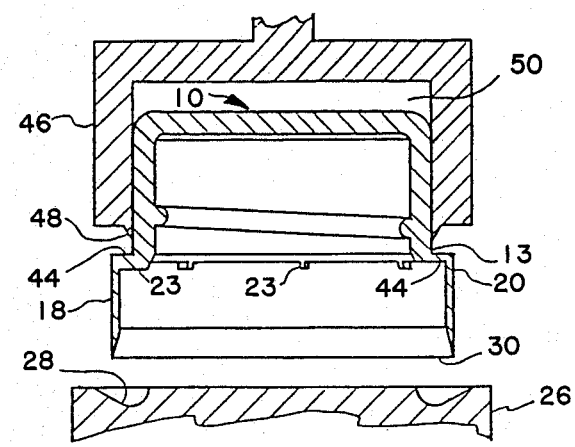
FIG. 19 is a longitudinal sectional view of still another embodiment of a cap of the invention, wherein the preform portion has a larger diameter than the diameter of the skirt portion of the cap and is about to be engaged by a holder and curling tool of the invention to form an inwardly curled ring in the preform.
Figure 20:
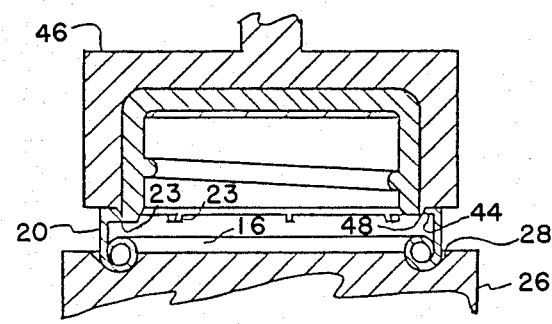
FIG. 20 is the same as FIG. 19 except that the inwardly curled ring has been fully formed.
Figure 21:
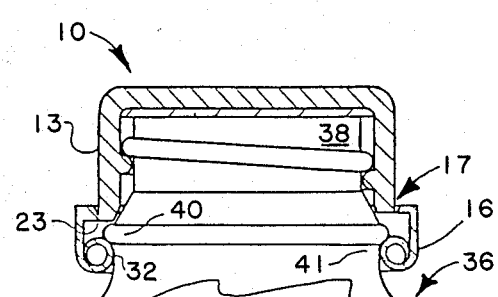
FIG. 21 is a longitudinal sectional view of the finished cap of FIG. 20 fully engaging and closing the illustrated bottle.

FIGS. 19–21 illustrate another means of forming the line of weakness 17 subsequent to molding and during the curling operation of the invention. In this case the cap 10 is molded to produce the tubular vertical band 18 having an inside diameter larger than the outside diameter of the upper skirt portion 13 and attached to skirt portion 13 by means of a radially extending flange 44. In spaced arrangement on the underside of flange 44 are a plurality of bridges 23 which also connect band 18 to skirt portion 13. The holder 46 for cap 18 during the curling operation is constructed with a peripheral cutting edge 48 located around the edge of its well 50.

During the curling operation the cap 10 is placed in the well 50 of the cap holder 46 and the groove 28 of the tool 26 engages the lip 30 of the cap band 18. As the tool 26 proceeds to curl the band 18, pressure is applied to the upper surface of flange 44 by the holder cutting edge 48 which proceeds to sever flange 44 so that it no longer connects band 18 to the upper skirt portion 13 but cutting edge 48 does not proceed to sever the spaced bridges 23 located on the underside of flange 44. In this manner the desired line of weakness 17 is created.

FIG. 21 shows the cap of FIG. 20 in engagement with the neck 38 of bottle 36. In this embodiment the neck 38 has a comparatively large diameter locking ring 40 and adjacent lower neck portion 41 so that the cap ring 16 undergoes a comparatively large expansion to snap over locking ring 40 and is also maintained in a state of significant expansion thereafter. However, because the curling operation has developed a state of significant compression in the inside portion 32 of ring 16 such expansion does not produce a comparatively high tension or elongation therein to weaken it as discussed in FIGS. 9–12.

Figure 22:
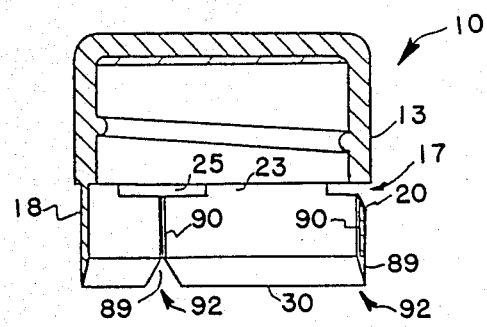
FIG. 22 is a longitudinal sectional view of another embodiment of a cap of the invention after molding, wherein the preform includes vertical slits and notches in its free end.

Referring now to FIGS. 22 to 26, still another embodiment of the invention is illustrated, wherein the ring 16 remains attached to the upper skirt portion 13 of cap 10 upon its removal from the bottle neck 38 as a result of strengthening the peripheral line of weakness 17 and providing one or more vertical lines of weakness 92 in the ring 16. FIG. 22 shows the cap 10 as molded with crack initiating notches 89 leading into vertical grooves 90 ending in slots 25 which provide vertical lines of weakness 92 in the cylindrical band 18 from its bottom rim 30 to its upper end 20. Between the slots 25 are bridges 23 connecting the upper portion 20 of band 18 to the upper skirt portion 13.

Figure 23:
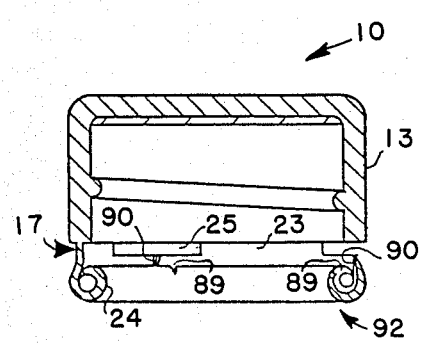
FIG. 23 is the same as FIG. 22, except that an inward curled "O" ring has been formed in the preform.

FIG. 23 shows the result of employing the curling operation of the invention on band 18 to produce the ring 16 having an "O" ring shape 24 in which the notches 89 and the now radial/vertical grooves 90 produce radial/vertical lines of weakness 92 throughout the full cross section of the ring 16.

Figure 24:
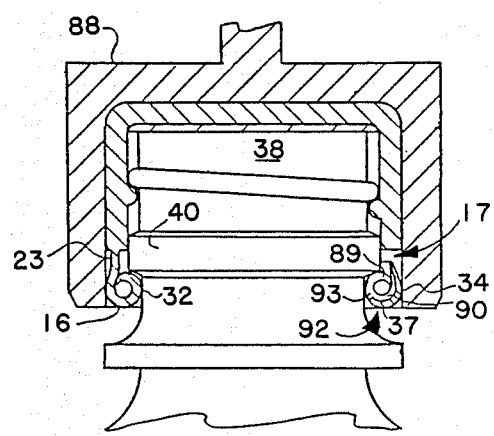
FIG. 24 is a longitudinal sectional view of the cap of FIG. 23 engaging and initially closing the illustrated bottle with the assistance of a capper.

FIG. 24 shows the cap 10 fully seated on the bottle neck 38 after capping wherein the inside portion 32 of the ring 16 has stretched to snap over the neck locking ring 40 with the result that the cracks 93 initiated by the notches 89 have progressed toward the bottom 37 of the ring 16 as a result of said stretching. However, since the ring 16 is hollow and the outer portion 34 is not contiguous with the inner portion 32 but is more remotely connected through the bottom portion 37, and because the outer portion 34 is restrained by the capper head 88, it is not subjected to significant stretching during the capping operation and crack 93 does not propogate beyond the bottom portion 37. Because the ring 16 is hollow the capper head 88 can be made to prevent the outer ring portion 34 from stretching without restraining the inner ring portion 32 from stretching, as required, and snapping over the neck locking ring 40 during capping. This provides assurance that the radial crack propogation does not occur in the outer portion 34 and that the ring 16 remains intact during and after the capping operation as shown in FIG. 24.

During uncapping the bridges 23 are of sufficient cross section and strength to resist rupture. As a result, the uncapping stresses developed in the ring 16 concentrate at the remaining portions of the radial/vertical grooves 90 in the lower and outer ring portions 37 and 34 which thereupon rupture in a tearing action allowing the entire cap 10 with the broken ring portions 95 to be removed intact from bottle neck 38.

Figure 25:
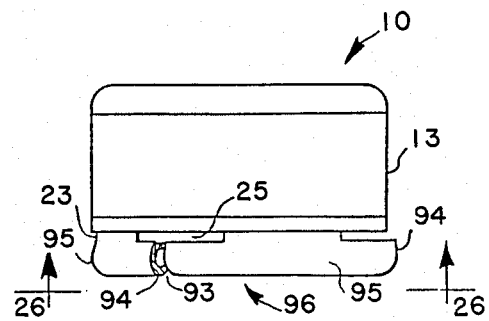
FIG. 25 is a longitudinal view of the cap of FIGS. 23 and 24 after the initial uncapping illustrating the ruptured radial portions in the "O" ring while the ring remains attached to the skirt of the cap.
Figure 26:
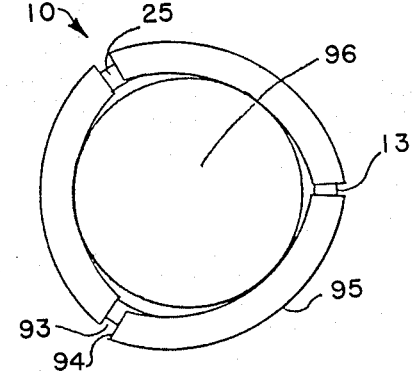
FIG. 26 is a bottom view of the cap of FIG. 25.

FIGS. 25 and 26 show the cap 10 after uncapping wherein, as a result of the hoop stresses imposed on the ring 16 by the curling method of the invention, the ends 94 of the broken ring portions 95 spring outwardly making the tamper evidence more obvious while at the same time facilitating the recapping of the bottle by displacing the ring portions outwardly from the cap lower opening 96. The degree to which the broken ring portions 95 and their ends 94 spring outwardly is governed by the lengths of slots 25 and the amount of hoop stress developed by the curling operation.

The invention in its broader aspects is not limited to the specific described embodiments and departures may be made therefrom within the scope of the accompanying claims without departing from the principles of the invention and without sacrificing its chief advantages.

I claim:

1. A method of forming a tamper evident cap for a container, comprising:
   molding a cap from plastic having a skirt including a lower free end,
   providing a line of weakness in said skirt, and
   engaging said lower free end of the plastic skirt with an esentially concave surface of a curling tool to curve said end into a curled resilient interfering free end which reduces the internal breadth of said skirt prior to capping and which is adapted upon capping to provide an interference with a container so that upon initial removal of the cap the line of weakness separates to thereby indicate the condition of the container.

2. The method of forming a cap according to claim 1, wherein said curled lower free end of the skirt has a cross section shape selected from the group consisting of a coil, O, U or J.

3. The method of forming a tamper evident cap for a container according to claim 25, wherein said lower free end is curved inwardly.

4. A method of forming a tamper evident cap for a container, comprising:
   molding a cap from plastic having a skirt including a lower free end,
   providing a line of weakness in said plastic skirt, and
   engaging said lower free end of said plastic skirt with an essentially concave surface of a curling tool to progressively curl said rim as said free end moves along said essentially concave surface of the curling tool inwardly and upwardly into a curled resilient interfering free end which reduces the internal breadth of said plastic skirt prior to capping and which is adapted upon capping to provide an interference with a container so that upon initial removal of the cap the line of weakness separates to indicate the condition of the container.

5. The method of forming a tamper evident cap for a container according to claim 4, comprising curling said lower free end into a cross sectional shape selected from the group consisting of a U or a J with a rim adapted to provide interfering engagement with a container.

6. A method of forming a tamper evident cap for a container, comprising:
   molding a cap from plastic having a skirt including a lower free end with a rim,
   providing a line of weakness in said skirt, and
   engaging said lower rim of said skirt in axial compression with an essentially concave surface of a curling tool to progressively curl said rim as said free end moves along said essentially concave surface of the curling tool inwardly from said skirt, upwardly and outwardly from said concave surface wherein said rim and adjacent free end continue to curl in response to the stresses developed therein while in contact with said essentially concave surface to produce a resilient free end having a cross sectional shape of an "O" which reduces the internal breadth of said plastic skirt prior to capping and which is adapted upon capping to provide an interference with a container so that upon initial removal of the cap the line of weakness separates to indicate the condition of the container.

7. A method of forming a tamper evident cap for a container, comprising:
molding a cap from plastic having a skirt including a lower free end with a rim,
providing a line of weakness in said skirt, and
engaging said lower rim of said skirt with an essentially concave surface of a curling tool to progressively curl said rim as said free end moves along said essentially concave surface of the curling tool inwardly from said skirt, upwardly and outwardly from said concave surface wherein said rim and adjacent free end continue to curl in response to the stresses developed therein while in contact with said essentially concave surface to produce a resilient free end having a cross sectional shape of a coiled ring which reduces the internal breadth of said plastic skirt prior to capping and which is adapted upon capping to provide an interference with a container so that upon initial removal of the cap the line of weakness separates to indicate the condition of the container.

8. The method of forming a cap according to claim 1, 4, 6, or 7, comprising molding the cap with a top wall and a depending annular skirt.

9. The method of forming a cap according to claim 8, comprising molding a cap with a continuous plastic top wall.

10. The method of forming a cap according to claim 8, comprising molding a cap so as to be adapted to receive a lid, wherein said lid comprises metal.

11. The method of forming a cap according to claims 1, 4, 6, or 7, comprising molding the line of weakness in the skirt during molding of the cap.

12. The method of forming a cap according to claim 11, comprising molding a peripheral line of weakness in the skirt about and above the free end to be curled.

13. The method of forming a cap according to claim 11, comprising molding a vertical line of weakness in the lower free end of the skirt during molding of the cap.

14. The method of forming a cap according to claims 1, 4, 6 or 7, comprising providing the line of weakness in said skirt after molding the cap.

15. The method of forming a cap according to claim 14, comprising providing a peripheral line of weakness about and above the free end.

16. The method of forming a cap according to claim 14, comprising providing a vertical line of weakness in the lower free end.

17. The metod of forming a cap according to claims 1, 4, 6 or 7, comprising restricting relative movement in the radial direction between said skirt and free end at the line of weakness during curling.

18. The method of forming the tamper evident cap of claims 1, 4, 6 or 7, comprising molding the cap with a line of weakness including slots peripehrally spaced about said skirt and above said free end, and bridges between said slots connecting said lower free end to said skirt having peripheral dimensions which are less than its radial dimensions, and
collapsing said bridges in a peripheral direction during curling of said free end.

19. The method of forming the tamper evident cap of claim 18 comprising the molding of the cap with a line of weakness including an internal projection depending from the upper portion of said line of weakness which engages said lower free end and limits radial movement between said skirt and free end at the line of weakness upon collapse of said bridges during curling.

20. The method of forming a cap according to claims 1, 4, 6 or 7, comprising opening the mold prior to curling said free end of said skirt.

21. The method of forming a cap according to claims 1, 4, 6 or 7, comprising removing the molded cap from the mold prior to curling said free end of said skirt.

22. A cap formed by the method of claims 1, 4, 6 or 7.

23. A tamper evident cap for a container, comprising:
a top wall, and
a plastic skirt depending from said top wall including a line of weakness therein, and a lower resilient free end which is curved away from said skirt into a resilient curled free end of plastic forming an arc of at least 50 degrees which is prestressed for enhancing the engaging and interferring functions of said curled free end, and wherein said prestressed curled free end reduces the breadth of said skirt prior to capping and is adapted upon capping to provide an interference with a container so that upon initial removal of the cap from the container the line of weakness separates to indicate the condition of the container.

24. The tamper evident cap of claim 23, wherein said curled resilient interfering free end of plastic has a cross sectional shape selected from the group consisting of a coil, O, U or J.

25. The cap of claim 24, wherein said curled free end has a cross sectional shape of a coil.

26. The cap of claim 24 wherein said curled free end has across section shape of an O.

27. The cap of claim 24 wherein said curled free end has a cross sectional shape of a U.

28. The cap of claim 24, wherein said curled free end has a cross sectional shape of a J.

29. The cap of claim 24, wherein said curled free end is curved inwardly.

30. The tamper evident cap of claim 24, wherein said presstressed curled free end has an outer portion in a state of tension and an inner container engaging and itnerferring portion in a state of compression.

31. The tamper evident cap of claim 24, wherein the cap is a twist cap.

32. The tamper evident cap of claim 24, wherein said curled free end is curved outwardly.

33. A tamper evident cap for a container, comprising:
a top wall, and
a plastic skirt depending from said top wall including a line of weakness therein, and a lower resilient free end with a rim wherein said free end is curled away from said skirt into a cross sectional shape selected from the group consisting of a coil or O which reduces the internal breadth of said skirt prior to capping and which is adapted upon capping to provide interference with a container so that upon initial removal of the cap from the container the line of weakness separates to indicate the condition of the container.

34. A tamper evident cap for a container, comprising:
a top wall, and
a plastic skirt depending from said top wall having a line of weakness therein, and a lower resilient free end terminating in a rim wherein said free end is curled inwardly away from said skirt into a stressed cross sectional shape selected from the group consisting of a coil or O which reduces the internal breadth of said skirt prior to capping and which is adapted upon capping to provide an interference with a container so that upon initial removal of the cap the line of weakness separates to indicate the condition of the the container.

35. The cap of claims 23, 33 or 34, wherein said line of weakness is about and above said curled free end.

36. The cap of claim 35, wherein said line of weakness is adapted to separate completely upon initial removal of the cap from a container, to thereby separate said curled free end from the cap.

37. The cap of claims 23, 33 or 34, wherein said line of weakness includes a vertical line of weakness in said lower curled free end.

38. The cap of claim 37, wherein said vertical line of weakness is internal and is not visible externally prior to separation.

39. The tamper evident cap of claims 23, 33, 34, wherein said line of weakness comprises slots peripherally spaced about said skirt above said free end, bridges between said slots connecting said lower free end to said skirt having peripheral dimensions which are less than the radial diemnsions and which are adapted to collapse in a peripheral direction upon curling said free end.

40. The tamper evident cap of claim 39, comprising a projection depending from said line of weakness adapted to engage said lower free end and limit radial movement between said skirt and free end at said line of weakness upon collapse of said bridges during curling.

41. A tamper evident cap of claims 23, 33, 34 in combination with a container.

* * * * *